Patented Apr. 11, 1950

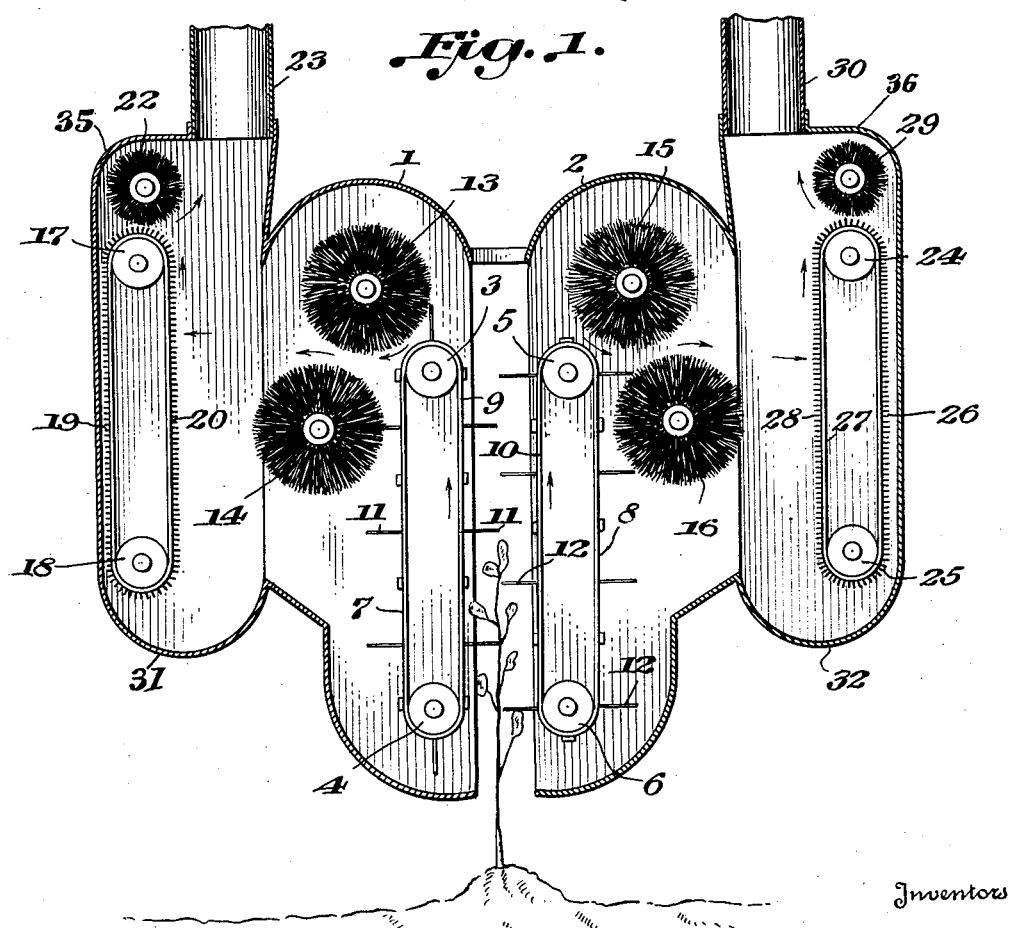

2,503,616

UNITED STATES PATENT OFFICE 2,503,616

COMBINED MACHINE FOR PICKING AND SEPARATING COTTON

James Henry Hamner, James Carl Hamner, and Lloyd Henry Hamner, Clarksdale, Miss.

Application March 16, 1948, Serial No. 15,084

4 Claims. (Cl. 56—49)

This invention is concerned with a cotton picking machine which picks cotton from a row of stalks in a field, elevates the cotton by means of the upwardly traveling flights of vertically moving belts, the traveling belt flights being in opposed position facing each other, and the present invention being particularly related to this mechanism combined with means for cleaning the cotton, and for conveying the cotton from the belts to the cleaning means and to a pneumatic conveyor after cleaning.

An object of the invention, therefore, is to provide a combined cotton picking and separator unit in a cotton picking machine.

Another object of the invention is to provide means for removing the cotton from the upwardly traveling belt flights which are provided with cotton picking means, and depositing the cotton on other conveyor means which latter conveyor means will pick up the cotton but will reject the leaves and twigs which have been removed from the stalks with the cotton by said upwardly traveling belt flights.

A further object of the invention is to provide, in combination with cotton picking mechanism, a separator which separates the leaves, stems and other debris from the cotton, and conveys the cotton to a position where it may be further conveyed by other conveyor means, such as pneumatic means, to a receptacle.

Other objects will appear hereinafter throughout the specification.

This application is a continuation-in-part of our application entitled "Machine for picking cotton," filed August 12, 1946, Serial No. 690,064, now Patent No. 2,438,393, granted March 23, 1948.

In the drawings:

Figure 1 is a front elevation of a cotton picking and separating machine with the casing shown in section in accordance with the present invention, and Figure 2 is a perspective view partly broken away, of the separating conveyor means of Figure 1.

The mechanism shown in Figure 1 of the drawings is adapted to pick cotton from a row of stalks as the machine proceeds along a row of stalks in the same manner as set forth in our application above referred to. The mechanism shown in Figure 1 may form part of a separate unit to be drawn by a tractor (not shown), or it may be incorporated in the tractor as shown in Figure 1 of our application above noted.

Generally speaking, the invention consists of mechanism for removing cotton from a standing row of stalks as the machine proceeds over the ground, by means of upwardly traveling belt flights having cotton removing means thereon, of mechanism for detaching the cotton from each upwardly moving flight at the top of the flight, and depositing the cotton on a special type of conveyor which rejects extraneous material but which picks up the cotton only and conveys it to a point where it may be picked up by the pneumatic conveyor, the burrs, leaves and limbs and other debris being permitted to fall in a receptacle by gravity.

The preferred structure includes a traveling machine (not shown) but as indicated in our above recited patent, on which is mounted a pair of units 1, 2, these units being mounted adjacent the front of the machine. The unit 1 is provided with upper and lower pulleys 3, 4, and the unit 2 is provided with upper and lower pulleys 5, 6. Preferredly, the upper pulleys 3 and 5 are driven by power off-takes from the engine of the tractor, but they may be driven by any suitable drive means.

Mounted on pulleys 3, 4 and 5, 6, are belts 7 and 8 respectively whose upwardly moving flights are designated by the numerals 9, 10.

The belts may be provided with cotton picking mechanism on the belts generally designated by the numerals 11, 12. This cotton picking mechanism on the belts is preferably the same as, or similar to, the cotton picking mechanism shown in our original application above noted.

Means are provided for removing the cotton from the cotton picking mechanism when it reaches the top of each belt flight, and this means consists preferably of a pair of power driven brushes in each unit, these brushes being driven by power off-take mechanism similar to that shown in our aforesaid application. The pair of brushes in the unit 1 are designated 13, 14 and those in unit 2 are designated 15, 16. Each pair of brushes removes the cotton containing some leaves and other debris, from the top of the upwardly moving flights and passes it with the debris, as indicated by the arrows in Figure 1, onto a combined conveyor and sorting means.

This conveying and sorting means includes in unit 1, and casing 35 having the upper and lower pulleys 17, 18 therein over which is trained a vertically moving belt 19 whose upwardly moving flight 20 faces the brushes 13, 14. The surface of the belt is provided with a plurality of closely spaced nail-like members 21. Located above the belt is a cotton removing brush 22 which removes the cotton at the top of flight 20 and causes the cotton to be pneumatically conveyed through pneumatic conduit 23 to a suitable receptacle (not shown). One or both pulleys 17, 18 may be power driven and brush 22 is also power driven, all from the common power source which drives the aforementioned brushes and cotton picking mechanism.

Unit 2 is provided with similar parts and similar drives for these parts, in which numerals 36 designate a casing, 24 and 25 designate pulleys for the vertically moving belt 26 having an upwardly moving flight 27, on which are mounted the nail-like members 28. Mounted above the upwardly moving flight is the power driven cotton removing brush 29 and located adjacent to this brush and slightly above the same is pneumatic conduit 30.

All of the pulleys and belts may be driven by a power take-off from the tractor engine, similar to that shown in our above noted application.

It will be understood that the nail-like members 21 are identical with the nail-like members 28. These preferably consist of small-diametered members which extend perpendicularly, in closely spaced relationship, from the face of the vertically moving belts 19 and 26. These members are located so close to each other, that when the cotton has been passed between brushes 13, 14 and 15, 16 and is forced against the upwardly moving flights 20, 28, the nail-like members 21, 28 will engage the cotton and elevate it to the brushes 22, 29, but due to the close spacing of these members, the burrs, leaves and small limbs, twigs or stalks which have found their way along with the cotton to these belts, are rejected by the nail-like members and fall by gravity to the receptacles 31, 32. This debris may be removed by suitable means, such as doors (not shown) which extend through the casings of each unit. The brushes 22, 29 dislodge the cotton from the nail-like members of the belts and direct it toward the air flow conduits 23, 30, where it is picked up and conveyed to a suitable receptacle on the machine.

Although we have shown a preferred means for removing and directing cotton with its debris thereon from the upwardly moving cotton picking mechanism in the form of pairs of brushes, it is to be understood that other suitable mechanism such as belts having bristles thereon may be substituted for the pairs of brushes 13, 14 and 15, 16. It will also be understood that, although we prefer the separating means shown, other means may be provided to take the place of the vertically moving belts 19, 26. We desire not to be limited to the separating mechanism shown, therefore, as the cotton may be separated from the debris by centrifugal means, gravity means or means other than that shown.

Our invention includes in its broadest aspect, a combined cotton picking and separating machine which, by means of upwardly traveling belt flights, picks the cotton from a row of cotton stalks as the machine moves over the ground. The machine further includes devices for taking the cotton at the top of each flight and conveying the cotton with debris to a separator where the debris is separated out while simultaneously conveying the cotton to an air flow line from each separator.

It is to be understood, therefore, that the above description and drawings are merely illustrative, and in nowise limiting, and that we desire to include within this invention such modifications as are comprehended within the scope of the appended claims.

We claim:

1. In a cotton picker machine, comprising a pair of cotton picking belt units having upwardly traveling picking belt flights, said belt flights being in opposed position facing each other, said upwardly traveling flights being provided with surfaces which extend from front to rear of said machine, said belt flight surfaces having doffing means for removing the cotton from the cotton stalks as the machine travels over the ground, the combination with said belt units of: separator means comprising a casing having a receptacle, said separator means further comprising an upwardly moving flight located adjacent to said doffing means, said belt having nail-like projections thereon, whereby said doffing means acts to throw said cotton against the upwardly moving flight of said last named belt whereby the cotton is caught by the nail-like projections thereon and the debris falls to said receptacle, and means including brushing means and pneumatic means for removing said cleaned cotton from said belt and conveying it from said separator means.

2. In a cotton picker machine, comprising a pair of cotton picking belt units having upwardly traveling picking belt flights, said belt flights being in opposed position facing each other, said upwardly traveling flights being provided with surfaces which extend from front to rear of said machine, said belt flight surfaces having doffing brushes for removing the cotton from the cotton stalks as the machine travels over the ground, the combination with said belt units of: separator means comprising a casing having a receptacle, a belt located in said receptacle having an upwardly moving flight located adjacent to said doffing brushes, said belt having a plurality of nail-like projections thereon, said doffing brushes acting to throw said cotton onto said moving belt whereby the cotton is caught by the nail-like projections on said belt and the debris falls into said receptacle, and means including brushing means and pneumatic means for removing said cleaned cotton from said belt and conveying it from said separator means.

3. In a cotton picker machine, comprising a pair of cotton picking belt units having upwardly traveling picking belt flights, said belt flights being in opposed position facing each other, said upwardly traveling flights being provided with surfaces which extend from front to rear of said machine, said belt flight surfaces having doffing brushes for removing the cotton from the cotton stalks as the machine travels over the ground, the combination with said belt units of: separator means comprising a casing having a receptacle, a belt located in said receptacle having an upwardly moving flight located adjacent to said doffing brushes, said belt having a plurality of nail-like projections thereon, said doffing brushes acting to throw said cotton onto said moving belt whereby the cotton is caught by the nail-like projections on said belt and the debris falls into said receptacle, and means including brushing means and pneumatic means located at the upper end of said last named belt flight for removing said cleaned cotton from said belt and conveying it from said separator means.

4. In a cotton picker machine, comprising a pair of cotton picking belt units having upwardly traveling picking belt flights, said belt flights being in opposed position facing each other, said upwardly traveling flights being provided with surfaces which extend from front to rear of said machine, said belt flight surfaces having doffing brushes for removing the cotton from the cotton stalks as the machine travels over the ground, the combination with said belt units of: separator means comprising a casing having a receptacle, a belt located in said receptacle having an upwardly moving flight located adjacent to said doffing brushes, said belt having a plurality of nail-like projections thereon, said doffing brushes acting to throw said cotton onto said moving belt whereby the cotton is caught by the nail-like projections on said belt and the debris falls into said receptacle and means including a rotary brush located above said last named belt and pneumatic means for removing said cleaned cotton from said belt and conveying it from said separator means.

JAMES HENRY HAMNER.
JAMES CARL HAMNER.
LLOYD HENRY HAMNER.

REFERENCES CITED

The following references are of record in the file of this patent:

UNITED STATES PATENTS

| Number | Name | Date |
| --- | --- | --- |
| 1,700,926 | Dykes | Feb. 5, 1929 |
| 1,750,536 | McDonald | Mar. 11, 1930 |
| 1,763,646 | Callahan | June 17, 1930 |
| 2,082,053 | Freudenberg | June 1, 1937 |
| 2,438,393 | Hamner et al. | Mar. 23, 1948 |
| 2,439,718 | Conrad | Apr. 13, 1948 |